United States Patent [19]
Sandy

[11] B 3,923,473
[45] Dec. 2, 1975

[54] CARBON RESIDUE INHIBITOR FOR DISTILLATE FUELS

[75] Inventor: Charles A. Sandy, Wilmington, Del.

[73] Assignee: E. I. Du Pont de Nemours and Company, Wilmington, Del.

[22] Filed: Nov. 16, 1973

[21] Appl. No.: 416,598

[44] Published under the Trial Voluntary Protest Program on January 28, 1975 as document no. B 416,598.

[52] U.S. Cl. .................................. 44/62; 44/79
[51] Int. Cl.[2] ................................ C10L 1/20
[58] Field of Search ................... 44/62, 80, 79

[56] References Cited
UNITED STATES PATENTS

| | | | |
|---|---|---|---|
| 3,337,313 | 8/1967 | Otto | 44/62 |
| 3,645,704 | 2/1972 | Burkard et al. | 44/62 |

*Primary Examiner*—Daniel E. Wyman
*Assistant Examiner*—Y. H. Smith
*Attorney, Agent, or Firm*—James A. Costello

[57] ABSTRACT

Disclosed herein are fuel oil compositions containing halogenated polypropylenes and/or halogenated polybutylenes having molecular weights in the range of about 400 to 3,000. These halogenated polyolefins have been found to reduce the tendency of the fuel oil to leave a carbon residue.

10 Claims, No Drawings

CARBON RESIDUE INHIBITOR FOR DISTILLATE FUELS

BACKGROUND OF THE INVENTION

1. Field of the Invention

This invention concerns fuel oil compositions containing halogenated polypropylenes and/or polybutylenes. Also included are concentrates of these halogenated polyolefin additives in a solvent.

2. Description of the Prior Art

Chlorinated ethylene-containing polymers of at least 20 weight percent polyethylene are known as pour point depressants for distillate fuels. Such polymers, in some instances, are characterized by molecular weights in excess of about 10,000.

In contradistinction to such art-known fuel additives, the additives of this invention contain no polyethylene, have molecular weights well below 10,000, and are not effective as pour point depressants.

SUMMARY OF THE INVENTION

This invention concerns a fuel oil composition comprising a fuel oil that boils in a range from about 250°F. to 800°F., and at least one member selected from the oil-soluble polymer group.

i. halogen-containing polypropylene
ii. halogen-containing polybutylene
iii. halogen-containing copolymer of propylene and butylene wherein the polymer has a molecular weight from about 400 to 3,000 and contains from about 0.1% to 25% by weight of halogen, the halogen being selected from the group chlorine and bomine, the polymer being present at a concentration from about 0.004 to 0.4 percent by weight of the composition.

The invention also concerns a concentrate of such polymer in a solvent or mixture of solvents selected from, for instance, hexane, benzene, toluene, xylene, petroleum naphtha, kerosene, heating oil and the like. The proportion of the polymer in the concentrate is from about 10% to 90% by weight, preferably from about 25% to 75%, and most preferably from about 30% to 70%.

DETAILS OF THE INVENTION

The polymers to be used in this invention (before halogenation) can be prepared by the various methods well-known in the art such as polymerization of propylene and/or butylene by ionic, free-radical and coordination catalysts. The present invention is not dependent upon the particular mode of preparation of the polyolefin. The molecular weights referred to herein are number average molecular weights determined by vapor pressure osmometry such as according to ASTM-2503. The molecular weights of the polyolefins are such that viscosities of these normally liquid materials range from about 60 SUS to about 25,000 SUS at 210°F., the SUS viscosity being determined according to ASTM-D-445-446. The polybutylene can be derived from 1-butylene, 2-butylene, isobutylene or any combination of the butylenes. Polyisobutylenes are preferred. The term polyisobutylene includes polymers that have incorporated in the polymer chain minor amounts of 1-butylene and/or 2-butylene units. Mixtures of polypropylene and polybutylene as well as copolymers of propylene and butylene are equally useful.

Halogen is incorporated into the polyolefin in accordance with any of the well-known techniques of organic chemistry. Thus, when the polyolefin contains olefinic unsaturation, hydrogen halide can be added across the double bond, with or without the use of catalyst, to provide halogen-containing polyolefin.

Halogen can also be introduced into the polyolefin by reacting the polyolefin with elemental halogen, such as chlorine or bromine, either by free-radical reaction catalyzed by light, heat or free-radical generator, or by the ionic addition of halogen to the olefinic unsaturation with or without catalyst such as ferric halide. The preparation of the halogenated polyolefin by the reaction of polyolefin with elemental halogen is the preferred method.

Halogenation can be carried out by contacting bromine or chlorine with neat polyolefin in the temperature range of from about 30°C. to 120°C. Halogenation can also be carried out by introducing bromine or chlorine into a solution of polyolefin at a convenient temperature. Whether a solvent is used or not, the reaction can be accelerated by either raising the temperature or by using light catalysis. Suitable solvents include methylene chloride, chloroform, carbon tetrachloride and the like.

Halogenation of the polyolefin can also be accomplished by the reaction of polyolefin with other known halogenating agents such as N-bomosuccinimide, sulfuryl chloride, oxalyl chloride, phosgene, nitrosyl chloride, phosphorus halides and the like. Thus, by reacting a polyolefin with nitrosyl chloride or with a mixture of chlorine and nitric oxide in the presence of light and/or catalysts such as peroxides, azo compounds, chloronitrosated polyolefin is obtained. As demonstrated hereinafter, the presence of other groups such as the nitroso group in chloronitrosated polyolefin, do not detract from the effectiveness of the halogenated polyolefin in reducing carbon residue.

Generally, halogenation is carried out until the desired amount of halogen is introduced into the polyolefin. The amount of halogen in the polyolefin will be from about 0.1 to 25% by weight, with from about 0.5 to 15% by weight preferred and from about 1 to 3% most preferred. The preferred halogens are chlorine and bromine, with chlorine being most preferred.

The fuel oil of the present invention composition is a mixture of hydrocarbons boiling in the range from about 250°F. to about 800°F. and includes diesel fuels, jet fuels, furnace oils, kerosene, heater oil, gas oils and the like as well as any mixture of fuel oils. The fuel oil can be virgin, thermally cracked or catalytically cracked fractions such as these fractions designated as cycle oils. The fuel oil can contain additives normally used in fuel oils such as rust inhibitors, corrosion inhibitors, antioxidants, dispersants, dyes, pour point depressants, pour improvers and the like.

The halogen-containing polyolefin of the invention can be incorporated into fuel oil in any conventional manner known in the art to blend a minor amount of additives to a major proportion of fuel. The amount of halogen-containing polyolefin to be incorporated into fuel oil will depend upon the inherent carbon residue forming tendency of the particular fuel oil and the degree of carbon residue reduction desired. Normally, the halogen-containing polyolefin is incorporated in the range of from about 10 pounds to 1,000 pounds per thousand barrels of fuel oil, i.e. 0.004 to 0.4 percent by weight of the composition, (a barrel capacity is 42 U.S.

Gallons), preferably from about 100 to 750 pounds per thousand barrels, i.e. 0.04 to 0.3 percent by weight of the composition, and most preferably from about 200 to 500 pounds per thousand barrels, i.e. 0.08 to 0.2 percent by weight of the composition.

Fuel Oil and Carbon Residues

In recognition of the undesirable effects of carbon residue on the performance of oil burners, specifications for fuel oils for domestic heating recite maximum levels of carbon residue allowable. Thus, according to ASTM D-396 for No. 1 fuel oil which is distillate oil intended for vaporizing pot-type burners and other burners requiring this grade of oil, the maximum allowable carbon residue on 10% bottoms is 0.15% while for No. 2 fuel oil for general purpose domestic heating in burners not requiring No. 1 fuel oil, the maximum allowable carbon residue on 10% bottoms is 0.35 %. In the normal procedures for determining carbon residues in distillate fuels as hereinafter described, the higher boiling fraction of the fuel oil is concentrated by distilling off 90% of the oil sample and the remaining 10% of the oil sample (10% bottoms) is used in the determination of carbon residue.

One recognized test for the determination of carbon residue is the Ramsbottom test (ASTM D-524). In that test, a sample is weighed in a special glass bulb having a capillary opening and placed in a metal furnace at 1,020°F. (550°C.). The sample is thus quickly heated to the point at which all volatile matter is evaporated out of the bulb with or without decomposition while the heavier residue remaining in the bulb undergoes cracking and coking reactions. After a specified heating period, the bulb is removed from the furnace, cooled in a desiccator and weighed. The residue remaining is calculated as a percentage of the original sample and reported as Ramsbottom carbon residue.

For petroleum products which are low in carbon residue, such as No. 1 and No. 2 fuel oils, a special procedure was developed to improve accuracy. The carbon residue test by the Ramsbottom method is made on the 10% residue after 90% of the oil been distilled off and the results are reported as "carbon residue on 10% bottoms."

The above-described test procedure for the carbon residue in fuel oils attempts to duplicate a series of complex reactions which occur during the formation of carbon residue in the actual operation of burners. It is believed that the reactions involved in the formation of carbon residue include among others, cracking and polymerization of the fuel components, particularly the higher boiling portions of the fuel, brought about by the influence of high temperatures encountered. While some portions of carbon residue are undoubtedly formed by the interaction of oxygen with some component of the fuel, it is generally considered that the presence of oxygen is not essential since carbon residues are formed in the relative absence of oxygen and the antioxidant compounds are in general ineffective in controlling the formation of carbon residue.

The following Examples are meant to illustrate but not to limit this invention. Unless indicated to the contrary, percentages are by weight.

PREPARATION A

Preparation of Chlorinated Polypropylene

Polypropylene (M.W. 850), 1,000 g, was placed in a reaction vessel equipped with a thermometer, an agitator and a gas inlet tube. The polypropylene was heated to 60°C. to 70°C. and purged with nitrogen gas for a few minutes and then chlorine gas was introduced into the polypropylene at a rate such that little or no chlorine was present in the exit gas stream. The addition of chlorine was continued for about 2 hours, then nitrogen gas was passed into the chlorinated polypropylene for about 5 hours to remove hydrogen chloride as well as any unreacted chlorine. The chlorinated polypropylene contained 2.6% chlorine.

PREPARATION B

Preparation of Chlorinated Polyisobutylene

In a reaction vessel equipped with a thermometer, an agitator, a gas inlet tube and a reflux condenser, 1,000 g of polyisobutylene (M.W. 1,400) was dissolved in 1,000 g of carbon tetrachloride. The solution was stirred and heated to about 60°C. and chlorine was introduced into the solution. The amount of chlorine introduced was such as to provide about 3 to 4% chlorine based on the weight of chlorinated polyisobutylene. Excess chlorine and carbon tetrachloride solvent were removed by distillation, leaving behind a chlorinated polyisobutylene which on analysis showed 3.5% chlorine.

EXAMPLE 1

In a reaction vessel equipped with a thermometer, an agitator, a gas inlet tube and a reflux condenser, 4,100 g (2.93 moles) of polyisobutylene (M.W. 1,400) was dissolved in 3,000 ml. of benzene. With the solution temperature at about 19°C. and the solution under agitation, 192 g (2.93 moles) of nitrosyl chloride (NOCl) was introduced via the gas inlet tube over a period of about 5½ hours. The solution temperature rose to about 33°C. during the addition of NOCl. The reaction mixture was purged with nitrogen gas to remove any unreacted NOCl and then refluxed (86°C.) overnight during which period about 14 g of water was evolved. The composition obtained was a 72% solution of chloronitirosated polyisobutylene in benzene. Analysis of a portion of the composition after removal of benzene showed 1.3% chlorine and 0.3% nitrogen.

EXAMPLES 2 to 4

These Examples illustrate the effectiveness of the compositions of Preparations A and B and of Example 1 in reducing carbon residue in light catalytic cycle gas oil. The light cycle oil had the following inspection data:

| | |
|---|---|
| Gravity | 23.3 |
| Pour °F | +15 |
| ASTM Distillation | (D86)°F |
| IBP | 408 |
| 5% | 462 |
| 10% | 478 |
| 20% | 497 |
| 50% | 530 |
| 90% | 596 |
| FBP | 636 |

The compositions of Preparations A and B were added to the fuel oil neat while the composition of Example 1 was added as a 72% solution in benzene.

In each case the additives were incorporated into light cycle oil at the indicated treating levels, the cycle oil distilled to remove 90% of the oil and Ramsbottom carbon residue determined on 10% bottoms according to ASTM D-524. The results are summarized in the following Table which shows decreasing amounts of carbon residue especially at the higher treatment levels.

TABLE 1

RAMSBOTTOM CARBON RESIDUE
Fuel: Light cycle gas oil

| Example No. | Additive | Treating Level lb./1,000 BBLS | RBC[1] (10% Bottoms) | % Change |
|---|---|---|---|---|
| — | None | — | 0.55 | |
| 2 | of Preparation A | 10 | — | |
| | | 50 | 0.50 | −9 |
| | | 100 | 0.42 | −24 |
| | | 500 | 0.29 | −47 |
| 3 | of Preparation B | 10 | 0.51 | −6 |
| | | 50 | 0.57 | +6 |
| | | 100 | 0.48 | −11 |
| | | 500 | 0.31 | −43 |
| 4 | of Example 1 | 10 | 0.48 | −13 |
| | | 50 | 0.48 | −13 |
| | | 100 | 0.42 | −24 |
| | | 500 | 0.32 | −42 |

[1] Ramsbottom Carbon Residue, %.

EXAMPLES 5 to 7

These Examples illustrate the reduced carbon residue in fuel oil blends containing the indicated halogenated polyolefins. The oil blends were prepared from light cycle gas oil as described in Examples 2 to 4, and No. 2 fuel oil having the following inspection data:

| | |
|---|---|
| Gravity | 34.1 |
| Pour, °F | −20 |
| ASTM Distillation | (D86), °F |
| IBP | 374 |
| 5% | 410 |
| 10% | 423 |
| 20% | 440 |
| 50% | 485 |
| 90% | 573 |
| FBP | 615 |

Blends of No. 2 fuel oil and light cycle oil having the composition of, by volume, 87.5%, 75%, 50% and 25% No. 2 fuel oil were prepared. The halogenated polyolefins of Preparation A and B and Example 1 were added to the oil blends at the indicated treating levels. The oil blends were distilled to remove 90% of the oil and Ramsbottom carbon residue determined on 10% bottoms according to ASTM D-524. The results are summarized in Table 2.

The results show that fuels containing the indicated halogenated polyolefins have reduced carbon residue, the fuels being No. 2 fuel oil and blends of No. 2 fuel oil with light cycle gas oil. The results also indicate that those blends of No. 2 fuel oil and light cycle gas oil whose carbon residues are above the specification limit for No. 2 oil (e.g. blends containing 50 volume % and 25 volume % No. 2 oil having carbon residue of 0.44% and 0.49% vs. 0.35% for specification) can be treated with 50 to 500 pounds per thousand barrels of the halogenated polyolefin (depending upon the particular halogenated polyolefin) to provide novel oil blends affording carbon residue values that meet specifications.

TABLE 2

RAMSBOTTOM CARBON RESIDUE (10% BOTTOMS)
No. 2 Fuel Oil - Light Cycle Oil Blends

| Example No. | Additive | Treating Level lb./1,000 BBLS | Volume % No. 2 Oil | | | | |
|---|---|---|---|---|---|---|---|
| | | | 100 RBC[1] | 87.5 RBC | 75 RBC | 50 RBC | 25 RBC |
| | None | — | 0.30 | 0.34 | 0.35 | 0.44 | 0.49 |
| 5 | of Preparation A | 10 | 0.26 | 0.35 | 0.31 | 0.38 | — |
| | | 50 | 0.27 | 0.34 | 0.28 | 0.32 | — |
| | | 100 | 0.27 | 0.32 | 0.39 | 0.28 | 0.42 |
| | | 250 | 0.24 | 0.24 | 0.22 | 0.25 | 0.34 |
| | | 500 | 0.20 | 0.22 | 0.17 | 0.27 | 0.21 |
| | | 750 | 0.14 | 0.20 | 0.22 | 0.22 | 0.19 |
| | | 1,000 | 0.14 | 0.25 | 0.12 | 0.20 | 0.16 |
| 6 | of Preparation B | 10 | 0.35 | 0.33 | 0.39 | 0.39 | 0.58 |
| | | 50 | 0.23 | 0.24 | 0.37 | 0.40 | 0.48 |
| | | 100 | 0.21 | 0.30 | 0.35 | 0.44 | 0.42 |
| | | 250 | 0.24 | 0.23 | 0.33 | 0.32 | 0.35 |
| | | 500 | 0.20 | 0.22 | 0.22 | 0.25 | 0.30 |
| | | 750 | 0.19 | 0.19 | 0.21 | 0.26 | 0.26 |
| | | 1,000 | 0.16 | 0.19 | 0.18 | 0.26 | 0.26 |
| 7 | of Example 1 | 10 | 0.28 | 0.28 | 0.32 | 0.48 | 0.52 |
| | | 50 | 0.31 | 0.28 | 0.32 | 0.44 | 0.49 |
| | | 100 | 0.28 | 0.27 | 0.28 | — | 0.30 |
| | | 250 | 0.25 | 0.21 | 0.22 | 0.28 | 0.30 |
| | | 500 | 0.11 | 0.17 | 0.25 | 0.24 | 0.28 |
| | | 750 | 0.09 | 0.16 | 0.23 | 0.24 | 0.26 |

TABLE 2-continued

| | | | RAMSBOTTOM CARBON RESIDUE (10% BOTTOMS) | | | | |
|---|---|---|---|---|---|---|---|
| | | | No. 2 Fuel Oil - Light Cycle Oil Blends | | | | |
| | | | | Volume % No. 2 Oil | | | |
| Example No. | Additive | Treating Level lb./1,000 BBLS | 100 RBC[1] | 87.5 RBC | 75 RBC | 50 RBC | 25 RBC |
| | | 1,000 | — | 0.18 | 0.23 | 0.25 | 0.26 |

[1] Ramsbottom Carbon Residue on 10% distillation residue, %.

The embodiments of the invention in which an exclusive property or privilege is claimed are defined as follows:

1. A fuel oil composition comprising a fuel oil that boils in a range from about 250°F. to 800°F., and at least one member selected from the oil-soluble polymer group
   i. halogen-containing polypropylene
   ii. halogen-containing polybutylene
   iii. halogen-containing copolymer of propylene and butylene wherein the polymer has a molecular weight from about 400 to 3,000 and contains from about 0.1% to 25% by weight of halogen, the halogen being selected from the group chlorine and bromine, the polymer being present at a concentration from about 0.004 to 0.4 percent weight of the composition.

2. A composition according to claim 1 wherein the polymer is halogen-containing polypropylene.

3. A composition according to claim 2 wherein the halogen is chlorine.

4. A composition according to claim 1 wherein the polymer is halogen-containing polybutylene.

5. A composition according to claim 4 wherein the polymer is chlorinated polyisobutylene.

6. A composition according to claim 1 wherein the polymer is halogen-containing copolymer of propylene and butylene.

7. A composition according to claim 6 wherein the halogen is chlorine.

8. A composition according to claim 1 wherein the concentration of polymer is from about 0.04 to 0.3 percent by weight of the composition and there is from about 0.5% to 15% halogen, by weight of the polymer.

9. A composition according to claim 8 wherein the concentration of polymer is from about 0.08 to 0.2 percent by weight of the composition and there is from about 1% to 3% halogen, by weight of the polymer.

10. A concentrate comprising from about 10% to 90%, by total weight, of at least one member of the oil-soluble polymer group
   i. halogen-containing polypropylene
   ii. halogen-containing polybutylene
   iii. halogen-containing copolymer of propylene and butylene in a solvent therefor, wherein the polymer has a molecular weight from about 400 to 3,000 and contains about 0.1% to 25%, by weight, of halogen selected from the group chlorine and bromine.

* * * * *